United States Patent Office

3,384,680
Patented May 21, 1968

3,384,680
CURING EPOXIDE RESINS WITH ENCAPSULATED SHIELDED CATALYSTS
Robert O. Lussow, University Park, Pa., assignor to The Boeing Company, Wichita, Kans.
No Drawing. Original application Apr. 8, 1963, Ser. No. 271,455. Divided and this application Oct. 13, 1965, Ser. No. 509,241
2 Claims. (Cl. 260—830)

ABSTRACT OF THE DISCLOSURE

Polyepoxides may be cured by encapsulated curing agents. A curing agent for polyepoxides is adsorbed on an adsorbent having internal pore structure and active pore sites. The adsorbent is coated with a shielding agent adsorbed into said adsorbent. In heating the mixture of the curing agent and polyepoxide the shielding agent and hardener desorb from the pore sites. The shielding agents include vinyl cyclohexene dioxide, 2,5-hexanedione, allylazelate, squalene and mixtures thereof. In an example 25 gm. of a liquid DGEBA were mixed with a curing agent described above containing 5 gm. metal aluminasilicate, 2 cc. diethylene triamine and 1 cc. vinyl cyclohexene dioxide.

---

This invention relates to encapsulation of chemical reagents and methods of producing and using same. More specifically, this invention relates to methods of encapsulating chemical reagents, reacting the encapsulated chemical reagents, and to the encapsulated component combination compositions. Still more specifically, this invention relates to encapsulation wherein a chemical reagent is adsorbed in an adsorbent having internal pore structure with active sites, and shielded with a shielding agent adsorbed on said adsorbent. The invention relates to a more effective encapsulation of chemical reagents which makes possible the combining of normally reactive chemical reagents into a mixture which is inert at room temperatures but can be activated to promote a reaction between the chemical reagents at a predetermined time under predetermined conditions. An important aspect of this invention relates to methods of encapsulating curing and hardening agents for polyepoxide resin compositions of matter, reacting and curing curable polyepoxide mixtures embodying an encapsulated curing and hardening agent, and to the encapsulated curing and hardening agent component combination composition. Another important aspect of this invention relates to methods of encapsulating catalysts for curing polyurethane polymeric materials, and to the encapsulated catalyst component combination.

This is a divisional application of copending parent U.S. patent application Ser. No. 271,455 filed Apr. 8, 1963, for "Encapsulation of Chemical Reagents."

The broad concept of encapsulating materials in a protective envelope, sack, coating or the like has been known in the art. This broad concept has been applied and used successfully in many applications, as for example, encapsulating medicinal compounds, pesticides, drugs, dyes and the like. Encapsulation generally has been employed for a variety of reasons. For example, it has been applied in the field of medicine to give bitter tasting medicine a more favorable or desirable taste, (2) to protect the medicinal preparation from vaporizing, oxidation, etc., and (3) to produce a delayed effect, the encapsulating coating isolating the medicinal preparation taken internally for a period of time while the coating dissolves.

The use of adsorption techniques to control and modify various types of chemical reactions, more specifically, curing reactions of plastics is known. These techniques usually involve adsorbing a chemical reagent in an adsorbent material. Commonly used adsorbent materials for this purpose are materials having internal pore structure and active pore sites, and can consist of silica gel, certain types of carbon black, activated charcoal, and the like. In practice, when using an adsorbed chemical reagent in a process involving a controlled chemical reaction, the adsorbed chemical reagent and adsorbent is admixed with the reacting component at relatively low temperatures and subsequently heated to desorb the adsorbed component. Heating the adsorbent and adsorbate product desorbs the adsorbate reagent reactant making it available for a reaction with a reacting component. The mixture prior to being activated is relatively inert and fairly safe to handle.

While the aforementioned reagent adsorption solves many of the problems in regard to process control, handling etc., there is in most instances a slow escape of the chemical reagent from the adsorbent. In many instances, this slow escape of chemical reagent from the adsorbent creates problems. The desorbed chemical reagent if in a reactive environment or reactive medium will allow a slow reaction between reagents to proceed. If the rate of escape of reactant is large and the resulting reaction is exothermic there is a possibility that the exothermic heat effect will generate sufficient heat in the mixture to desorb and activate the entire mixture, or at least accelerate the desorption. Further, the slow escape of chemical reagent will cause product deterioration, and shortened shelf life of an adsorbed component mixture. In general, depending on the type of adsorbent and adsorbate chemical reagent, the rate of escape of adsorbate from adsorbent will vary. Even a small escape of adsorbate is objectionable and in certain instances can cause very serious effects.

In the reagent adsorption techniques known to the prior art, adsorbed chemical reagent when present in a surrounding medium containing a reactive medium, is not rendered completely inert. In general, an adsorbent has an open pore structure. A portion of the adsorbed chemical reagent is in immediate contact with the reactive medium and is therefore in a potentially reactive position. The adsorbed chemical reagent molecules, even though attracted and held in the active pore sites by Van der Waals forces will often be dislodged from the adsorbent by the normal molecular vibration of the chemical components, and will be free to react with the reactive medium. The tendency to dislodge the adsorbed adsorbate and the seriousness of this effect will vary with the type of adsorbate, the adsorbent and the reactive medium and the other possible components having a tendency to displace the adsorbate. Normally, the function of the adsorbent is to prevent or delay a reaction between the adsorbed chemical reagent and a reactive surrounding medium. The more efficiently this function is performed, in general, the more desirable is the adsorption system. Therefore, adsorption of chemical reagents known to the prior art will not produce complete inertness, of a chemical reagent. Further, if the adsorbent in the chemical reagent combination is selected so that the adsorbate is very securely attached to the adsorbent, thus producing a very inert adsorbent adsorbate combination, it may require an extremely powerful displacing agent or heat effect to activate the material. For example, when the adsorbent adsorbate must be heated to extremely high temperatures in order to desorb the adsorbed reagent, other reagents in the mixture may be decomposed. This effect may completely prohibit the use of an adsorbed chemical reagent. An example is a decomposable blowing agent in a foamable mixture that will cure at a relatively low temperature. If the mixture is heated high enough to desorb the blowing agent, the reaction may proceed too rapidly and scorch, burn or cure the resin poorly.

I have invented a controlled method of reacting materials. In the new method of reacting materials of my invention I admix a first surrounding medium reactant and a second inactivated reactant. The second inactivated reactant is consisted of an adsorbent having an internal port structure, a reactant adsorbed in the adsorbent in the internal pore structure thereof, and a shielding and encapsulating agent adsorbed on the adsorbent isolating the internally adsorbed reactant. Subsequently the adsorbed shielding and encapsulating agent and reactant are desorbed from the adsorbent. The first reactant is then reacted with the resulting desorbed reactant. Preferably, the shielding and encapsulating agent and reactant are desorbed from the adsorbent by heating the resulting curable mixture, or in the alternative the desorption can be accomplished by the use of a displacing agent.

A preferred specific embodiment of my new method of reacting materials is the curing of polymeric polyepoxide compositions of matter. My new method of curing polymeric polyepoxide compositions of matter comprises mixing a resin comprised of a composition of matter of a polymeric polyepoxide having an

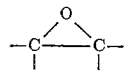

equivalency greater than one, and an encapsulated curing agent. The encapsulated curing agent consists of an adsorbent having internal pore structure and active pore sites, a curing and hardening agent for polyepoxides adsorbed in the active pore sites of the adsorbent, and a shielding agent adsorbed on the adsorbent in a position shielding the curing and hardening agent. In my method of reacting, the adsorbed shielding agent and the curing agent are displaced from the adsorbent, and the resultant desorbed curing agent and polymeric polyepoxide composition of matter are reacted. Preferably, the displacement of the adsorbed shielding agent and curing agent is accomplished by heating the curable polyepoxide mixture, or by displacing the curing agent and shielding agent with a displacing agent that is more strongly adsorbed on the adsorbent. Preferably the reaction between the curing agent and polymeric polyepoxide is accomplished by continued heating of the mixture.

I have invented a new loaded adsorbent comprised of the combination of an adsorbent having internal pore structure, a material adsorbed in the adsorbent in the internal port structure thereof, and a shielding and encapsulating agent adsorbed on the adsorbent material. The loaded adsorbent of my invention can be used for encapsulating a variety of chemical reagents as for example, catalysts for urethane polymerization, catalysts, vulcanizing and acceleration agents for rubber and rubber-like materials, blowing agents for foaming mixtures, gases, and the like.

An important embodiment of the new loaded adsorbent of my invention is a combination of an adsorbent having internal pore structure, a curing and hardening agent for polymeric compositions of matter of polymeric polyepoxides having an

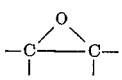

equivalency greater than one with the curing and hardening agent adsorbed in the adsorbent in the internal pore structure thereof, and a shielding and encapsulating agent adsorbed on the adsorbent functioning to isolate the internally adsorbed curing and hardening agent. Preferably, the curing and hardening agents for polymeric polyepoxides for use in the practice of my invention are the primary, secondary and tertiary amines, and the catalytic curing agents.

The method of encapsulating chemical reagents of my invention comprises, adsorbing a chemical reagent within an adsorbent having internal pore structure and active pore sites, and adsorbing a shielding agent on the surface of the adsorbent in a position shielding the adsorbed chemical reagent.

A very important embodiment of the new method of my invention of encapsulating chemical reagents relates to the encapsulation of curing and hardening agents for polyepoxides. This embodiment of encapsulating curing and hardening agents for polyepoxides comprises adsorbing a curing and hardening agent for polyepoxides in an adsorbent having the internal pore structure, and adsorbing a shielding agent on the surface of the adsorbent, thus shielding the adsorbed curing and hardening agent for polyepoxides.

The new method of my invention of curing polyurethane resin comprises admixing a polymerizable polyether resin selected from the group consisting of polyethers formed from direct polymerization of oxides of normally gaseous aliphatic hydrocarbons, condensation of oxides of normally gaseous aliphatic hydrocarbons with an aliphatic polyalcohol having from 3 to 8 carbon atoms in the molecule and 2 to 5 hydroxyl groups, and mixtures thereof, and an encapsulated catalyst. The encapsulated catalyst is comprised of an adsorbent material having internal pore structure and active pore sites, a catalyst for polyurethanes adsorbed in the pore structure of the adsorbent, and a shielding secondary adsorbate agent adsorbed on the adsorbent. In the method of curing polyurethanes of my invention the catalyst and shielding secondary adsorbate agent are desorbed from the adsorbent and the polyether and isocyanate reacted to form a polyurethane resin.

My new method of reacting chemical reagents, my new loaded adsorbent composition, and my new method of producing the loaded adsorbent composition of my invention solve the problems associated with encapsulation known to the prior art. The new loaded adsorbent of my invention including a component combination composition of primary adsorbate and a shielding secondary adsorbate provides an improved very efficient means of encapsulating a chemical reagent. A chemical reagent encapsulated in my component combination as a primary adsorbate is highly inert and can therefore be stored for long periods of time without product deterioration and/or can be combined in a surrounding medium containing reactive components to form an inactivated reactive mixture. More specifically, the shielding secondary adsorbate shields the primary adsorbate, namely the adsorbed chemical reagent, from the surrounding medium by the physical interposition of barrier. Moreover, this shielding secondary adsorbate can very readily be removed by desorbing same to thus activate the reactive mixture. The shielding agent adsorbed on an adsorbent has been found to actively and positively reduce the normal and inevitable escape of primary adsorbate from an adsorbent material. Further, this reduction of the rate of molecular escape is accomplished without selecting a combination of adsorbent and primary adsorbate which would be difficult to separate without possibly harming the reactive product obtained from the reactive mixture It is an object of this invention to provide a new method of encapsulation.

It is another object of this invention to provide a new method of reacting chemical reagents.

Still another object of this invention is to provide a new method of encapsulating chemical reagents.

Yet another object of this invention is to provide a new method of curing polyepoxides.

Still another object of this invention is to provide new combinations of encapsulated chemical reagents.

Another object of this invention is to provide a new method of producing encapsulated and shielded curing and hardening agents for polyepoxides, and a new method of curing polyepoxides using the encapsulated curing agent.

Another object of this invention is to provide a new method of encapsulating reactive chemical reagents, such as catalysts, blowing agents, accelerators, gases, and the like.

Yet another object of this invention is to provide a new method of encapsulating chemical reagents involving a adsorbing chemical reagent in an adsorbent having pore structure with active pore sites and providing a shielding agent adsorbed on said adsorbent protecting and shielding the adsorbed chemical reagent.

It is another object of this invention to provide a new encapsulation component combination composition wherein an adsorbate is adsorbed in the pore structure of an adsorbent with a secondary adsorbent having a molecular diameter greater than the diameter of the pores of the adsorbent and less strongly adsorbed than the adsorbent to shield the adsorbate.

Yet another object of this invention is to provide a new controlled method of producing polyurethane resins wherein a catalyst for polyurethanes is encapsulated in an adsorbent material and desorbed and used in subsequent curing reaction.

Yet another object of this invention is to provide an adsorbate in an adsorbent material with a shielding agent adsorbed on the adsorbent.

Still another object of this invention is to provide new inert but reactive mixtures embodying an adsorbed and shielded chemical reactant which can be desorbed to activate the reactive mixture and thereby make possible the controlled reaction.

Yet another object of this invention is to provide a new method for increasing the shelf life of chemical reagents.

Still another object of this invention is to provide new methods of encapsulating accelerators and other curing agents for rubber and new methods of curing rubber.

Other objects and advantages of the new compositions of matter, products and process of my invention will become apparent to those skilled in the art upon reading this disclosure.

In the following is a discussion and description of the new methods, compositions of matter, and products of my invention. Such discussion and description is made with reference to preferred specific embodiments of my invention and it is to be understood that such is not to unduly limit the scope of my invention.

This invention is based on my discovery that an adsorbent material having internal pore structure and having a primary adsorbate adsorbed therein within the pore structure can be provided with a shielding agent thus forming an encapsulated combination system. I discovered that a shielding agent consisting of an adsorbed material on the adsorbent having adsorbed therein an adsorbate will greatly increase the efficiency, inertness to a surrounding medium, process characteristics, etc. of an adsorbent adsorbate component combination. The component combination composition of my invention consists basically of an adsorbent material having internal pore structure and active pore sites, a chemical reagent adsorbed within the pore structure of the adsorbent, and a shielding agent comprised of a secondary adsorbate adsorbed on the adsorbent functioning as a shield to the adsorbed chemical reagent. The aforementioned encapsulation system, or component combination composition of my invention has great utility. An important use is in the storage of gas, chemicals, etc. The component combination composition of my invention can be made very inert by the proper selection of an adsorbent and secondary adsorbate. The chemical reagent stored in the component combination composition of my invention will be securely sealed within the adsorbent and will have a very long shelf life. Further, the adsorbed and encapsulated chemical reagent can be made inert to various types of environment. Further, the shielding agent will reduce the vapor pressure of the chemical reagent adsorbed in the adsorbate.

Another important use of the component combination composition of my invention is to provide a positive means of controlling a reaction when one of the reactants of a reactive system is the chemical reagent adsorbed in the adsorbent. When the compositions of my invention are used in a reacting process, the system is comprised of the adsorbed chemical reagent and a surrounding medium. The surrounding medium includes a chemical reagent that will react with the adsorbed chemical reactant. The surrounding medium can include other elements or components which do not enter into the reaction. In order to illustrate a practical application of the system of my invention reference will be had to the curing of polyepoxide resins. A curable polyepoxide resin mixture can consist of a composition of matter of a polymeric polyepoxide having an epoxide equivalency greater than one, a curing agent, and if the curable mixture is to be foamed it can include a foaming agent. In a curable polyepoxide mixture, the polymeric polyepoxide and the blowing agent comprise the surrounding medium, the curing agent is the chemical reagent. A curable polyepoxide mixture modified in accordance with the teachings of my invention would include an adsorbent having adsorbed therein the curing agent, and a shielding agent or secondary adsorbate adsorbed on the adsorbent protecting and encapsulating the reactive curing agent.

In the new method of my invention of reacting materials the components of the reacting system are desirably compatible. In generally, at room temperature and shielding agent or secondary adsorbate, and the adsorbent and the reacting medium are desirably mutually unreactive. Further, the shielding agent and the adsorbed chemical reagent are desirably unreactive. The shielding agent, or secondary adsorbate, is normally desirably more strongly adsorbed on the adsorbent than any element or combination of elements in the surrounding media in the temperature range the encapsulation is to be effective. However, the adsorbed chemical reagent is desirably more preferably adsorbed than the shielding secondary adsorbate on the adsorbent. Further, the moleculer diameter of the chemical reagent preferably is smaller than the diameter of the pore structure of the adsorbent in order that the chemical reagent can be taken within the adsorbent. Preferably, the molecular diameter of the secondary adsorbate will be greater than the diameter of the pores of the adsorbent. With the preferred component relationship, the secondary adsorbate will be adsorbed or plastered to the adsorbent to effectively seal the chemical reagent, or primary adsorbate, in the pores of the adsorbent and seal out the surrounding media. I have found that since the secondary adsorbate shields or separates the reactive primary adsorbate or chemical reagent, from the surrounding media containing a reacting chemical reagent, it effectively prevents a reaction therebetween. Also, I have found that both the secondary adsorbate, or shielding agent, and the primary adsorbate, or chemical reagent, are held in place in and on the adsorbent material by Van der Weals forces.

By encapsulating an adsorbed reacting component in an adsorbent thus sealing and inactivating the component, it can be combined with one or more reactive components to form an inactivated mixture of chemically reactive components. The reactive mixture of my invention in its inactivated state is inert, can be handled easily and safely, will not deteriorate, and has a very long shelf life, etc.

When a reaction between the adsorbed reactant and the reactant in the surrounding media is desired, the secondary adsorbate and the adsorbed reactant can be dislodged from the adsorbate to activate the mixture. This can conveniently be accomplished by either heating the mixture, or dislodging the secondary and primary adsorbate by a chemical releasing agent. I have found that heating the mixture causes dislodging of the primary and secondary adsorbate, and that the strength of the thermal vibrations of the molecules overcomes the Van de Waals forces holding the molecules to the adsorbent.

A chemical release agent can be added to the inactivated mixture to desorb the secondary adsorbate and the primary adsorbate. By chemical release agent I mean a material which is more strongly adsorbed in the pore structure of the adsorbent than either the primary or secondary adsorbates. The chemical release agent preferably should have a smaller molecular diameter than the diameter of the pores of the adsorbent. When the primary adsorbate is displaced, either by heating the mixture until the thermal vibrations of the molecules overcome the attractive forces attracting the adsorbate to the absorbent, or by adding a chemical release agent which displaces the primary and secondary adsorbates it thereby is free to react with a reactant in the surrounding media. The adsorbent and the secondary adsorbate ordinarily remain in the reactant mixture or resin, as the case may be, as inert filter material.

The method of producing the new component combination compositions of my invention involves adsorbing a chemical reagent or chemical into an adsorbent and subsequently adsorbing a shielding secondary adsorbate on the adsorbent. Any suitable method of accomplishing this can be used. The manner of loading a given chemical component into the adsorbent is determined by the properties of the chemical component. I have found liquids and solids which have an appreciable vapor pressure at room temperature or slightly elevated temperatures can be loaded into the adsorbent by desiccator method. A weighed amount of unloaded adsorbent is placed in a vacuum desiccator in a container which exposes a substantial surface of the adsorbent. Preferably the adsorbent is degassed by heating it to an elevated temperature for a suitable, usually prolonged, period of time. It is advisable that care be exercised to prevent adsorption of atmospheric moisture by the degassed adsorbent while loading it in the desiccator. The chemical reagent or solid having an appreciable vapor pressure is added to the unloaded adsorbent in the desiccator in the desired ratio. In general, chemicals can be loaded in the adsorbent in a range of 10 percent to 30 percent by weight. The desiccator is then evacuated and the mixture allowed to stand for a suitable period of time, preferably in excess of 12 hours. The rate of adsorption is a direct function of the vapor pressure of the compound being loaded. If the rate of adsorption is too slow at room temperature it can be increased by placing the desiccator in an oven at an elevated temperature. Caution is advised when working with temperature sensitive compounds, since the heat of adsorption can be sufficient to decompose the chemical. After the chemical reagent has been adsorbed in the adsorbent, the desiccator is opened and the shielding agent or secondary adsorbate introduced therein. The desiccator is then closed and the resultant mixture allowed to stand for a suitable length of time, usually in excess of 12 hours.

Non-volatile solids and liquids can be loaded into the adsorbent by the solution method. The preferred solvents for such method are the normal hydrocarbons such as a N-hexane, decane, etc. When the chemical reagent to be loaded is only soluble in aromatic hydrocarbons these solvents can be and are desirably used. I have found that benzene is preferred over toluene or xylene because it is easier to remove after the adsorption operation. A list of solvents which can be used arranged in order of desirability are: (1) normal hydrocarbons, (2) glycolethers, (3) ethers, (4) benzene, (5) toluene, (6) xylene, (7) phthalates, (8) vinyl monomers, (9) mixtures of the foregoing, and the like. The preferred solvent for use in the loading of an adsorbent in the manner of my invention is one which is physically too large to be adsorbed by the adsorbent and hence cannot cause any displacement of adsorbate. The foregoing classes of solvents are arranged in order of increasing tendency to cause displacement of active chemical from a loaded adsorbent. A combined adsorbent and benzene make a slurry. In preparing the slurry, the heat of adsorption is kept under control by carefully adding the adsorbent. It has been found desirable while agitating the slurry, to slowly add the chemical reagent to be adsorbed, avoiding any excessive temperature increase caused by the heat of adsorption. In most cases very little temperature increase has been observed, since the chemical displaces solvent and the heat of adsorption compensates for the heat of desorption of the solvent. When maximum loading of active chemical is desired an excess of this chemical is preferably added to the slurry. If a specific loading is desired, it is necessary to add only the required amount. Refluxing the solvent can be used to obtain a reasonable rate of adsorption. After the chemical has been adsorbed in the adsorbate the shielding agent is added and the entire mixture agitated. When using this embodiment of my invention of loading and shielding the adsorbent care is desirably taken that the solvent is not more strongly attracted to the adsorbent than is the shielding secondary adsorbate. The solvent is subsequently separated from the loaded and shielded adsorbent composition of my invention.

Another preferred embodiment of my invention of producing the new encapsulated combination component of the compositions of matter of my invention involves first adding a primary adsorbate to an unloaded adsorbent material, agitating and allowing sufficient time for the primary adsorbate to become adsorbed, second adding the shielding secondary adsorbate to the resulting mixture, agitating and allowing sufficient time for the secondary adsorbate to become adsorbed. This method of loading and shielding an adsorbent to produce my new component combination compositions has been found especially useful in the production of encapsulated curing agents for polyepoxides and can be used for encapsulating many other components.

Any suitable chemical component that can be adsorbed in an adsorbent and shielded with a secondary adsorbate can be used in the practice of my invention. Some of the types of chemicals which can be loaded and shielded in adsorbents in the manner of my invention are the following: amines, ethers, alcohols, aldehydes, ketones, esters, peroxides, hydrocarbons, anhydrides, organic acids, organo-metallic compounds, halogens, acid gases, perfumes, and the like. Most preferably molecules of the foregoing chemicals that have a critical diameter less than 10 angstrom units are loaded into the adsorbent and shielded in the manner of my invention.

The new encapsulated component combination compositions of an adsorbent, primary adsorbate and secondary shielding adsorbate of my invention can act as a carrier for a wide variety of chemical compounds. When needed, the chemical reagent or reactant is released by heating the adsorbent adsorbate and shielding agent combination, or by displacement of the primary adsorbate and shielding agent with another agent such as water. Very often the volatility, toxicity, or odor of many chemical compounds restricts their usefulness. Yet, those same compounds are frequently technically desirable, most readily available, and least expensive. The component combination compositions of my invention make it possible to harness many of these compounds by depressing their reactive or noxious properties. By adsorbing chemicals within the adsorbent port structure, and shielding them with a secondary adsorbate their volatility is greatly reduced if not eliminated. By virtue of this property the new encapsulated component combination compositions of my invention can be used to positively isolate an adsorbed chemical within a solid, liquid, or gaseous system containing a reactive media until released from adsorbent by heat or displacing by a displacing agent. It can very effectively be used to store chemicals for prolonged periods of time. The component combination composition of my invention can be used in the soap, detergent and cosmetic industries for encapsulating bleaches, perfumes, cleaning agents, sudsing agents, and germicidal agents, etc. The compositions of my invention can be used to store and control processes utilizing chlorine and chlorine compounds, trichloro cyanurate acid, chlorine dioxide, lilac oil, lemon oil, cedar pine oil, isoboronyl acetate, methanol, hydrogen chloride, ammonia, formaldehyde, etc. In the agricultural industries, the component combination compositions of my invention are useful for encapsulating defoliating agents, pesticides, fungicides, insecticides, fumigants, and ripening agents, etc. My invention also has potential application for the storing of isotopes. Several radioactive isotope materials such as iodine and radon can be loaded on adsorbents and shielded with a secondary adsorbate. The ease of handling powdered or pelleted materials of my compositions appreciably increase their usefulness in the pharmaceutical, medicinal, and general scientific fields. In addition, my encapsulating component combinations can be used very advantageously to store radioactive wastes while the decay process is taking place. In the rocket and missile industry fuels and ignitors can be loaded on adsorbents and shielded with a secondary adsorbate with advantage to their handling and combustion characteristics. The rubber and plastics industry are greatly benefited by my invention. Various reactant components for producing rubber and plastic can conveniently be loaded into adsorbents and shielded with a secondary adsorbate thus positively rendering the reactants inert until such time as they are released. With chemical reagent reactants encapsulated and reacted in the manner of my invention it is possible to produce inactuated highly reactive mixtures which can be handled, stored, poured in place, etc. and subsequently activated and reacted, wherein there is provided a positive means of control over reaction process phases. For example, my component combination compositions can be used to store antioxidants, antiozonants, curing agents, odorants, blowing agents, catalysts, etc. In the rubber industry commonly known accelerators such as piperidine, di-n-butylamine, hydrogen chloride, morpholine, tertiary butyl, hydroperoxide and the like can be rendered inert and mixed into the uncured rubber mixture and activated. This embodiment of invention makes possible a high curing rate without materially affecting the Mooney scorch time. Various well-known catalysts useful in the curing processes of epoxy resins such as triethanolamine, triethylamine, n-methyl morpholine, dimethylethanolamine, and the like can be encapsulated and rendered inert, and used in curable polyepoxide mixtures to provide increased processing, versatility, safety and control. Commonly known catalysts for the curing of polyurethanes such as n-methylmorpholine, dimethylethanolamine, triethylamine, etc., can be used to increase the rate of cure, processing safety, ease of control, etc. of polyurethane curing processes.

My encapsulated component combination compositions of adsorbent adsorbate and shielding agent and my method of encapsulating, and methods of reacting reactants can very advantageously be used in the production and handling of paints and inks, glues and adhesives, and gas and liquid storage, etc. For example, laten dryers can be introduced into paint and ink formulations to prevent premature gellation and overcure. Pot life in plastic base paints can be extended with my component compositions. Volatile and reactive catalysts in an adsorbent and shielded with a secondary adsorbate can be introduced into glues and adhesives to greatly increase their processing safety and ease.

A preferred specific embodiment of my invention pertains to the curing and hardening of polyepoxide compositions of matter. My encapsulated component combination compositions of an adsorbent, adsorabte, and secondary shielding adsorbate, my method of curing and hardening polyepoxides using my encapsulated component combination composition, and my method of encapsulating curing agents have proven to be very beneficial in actual use. There is provided a positive means of controlling the curing and hardening reaction. The method of curing and hardening of polyepoxides of my invention involves preparing a curable mixture of an encapsulated curing agent composed of an adsorbent having internal pore structure and active pore sites, a curing and hardening agent for polyepoxides adsorbed in the internal pore structure of said adsorbent, and a shielding agent adsorbed on said adsorbent in a position shielding said curing agent, mixed therewith a resin comprised of a composition of matter of a polymeric polyepoxide having an epoxide equivalency greater than one. My method of curing polyepoxides can also be used to produce foam composition. The curable mixture can be deposited either into a mold, an enclosure for curing in situ, or any suitable forming enclosure. After the curable mixture has been deposited in a suitable mold or form, the reaction between the encapsulated curing agent and the polymeric polyepoxide is initiated, thereby activating the mixture, by displacing the adsorbed shielding agent and curing agent from the adsorbent. Preferably, the displacement is accomplished by either heating the curable mixture, or adding a displacing agent. When the curing agent has been displaced from the adsorbent, it is free to react with the polymeric polyepoxide. The curing reaction can be accelerated if desired or necessary by further heating of the activated mixture. If a polyepoxide foam product is desired, a blowing agent is also included in the aforementioned curable mixture. Preferably, the blowing agent is also encapsulated in a suitable adsorbent and suitable shielding agent in the same manner as the curing agent.

Any suitable adsorbent material can be used in the practice of my invention relating to the curing and hardening of polyepoxides. Suitable adsorbents having an internal pore structure and active pore sites therein for use in the practice of my invention are sodium alumina silicate, silica gel, activated carbon black, activated charcoal, natural clays, etc. I prefer to use an adsorbent with a specific surface of area in the range of 400 to 1100, more preferably 700 to 800, and a specific pore volume in the range of 0.1 to 0.5, more preferably in the range of 0.2 to 0.35. Any suitable secondary adsorbate for shielding the curing agent in the adsorbent can be used in the practice of my invention. The secondary adsorbate should desirably have an average molecular diameter greater than the average pore diameter of the adsorbent. Preferred shielding agents for use in the practice of my invention for use in encapsulating curing agents and in methods of curing and hardening of polyepoxides are vinyl cyclo hexene dioxide, 2,5, hexane dione, squalene, allylazelate, and mixtures thereof. I prefer to use an amount of shielding agent in the range of 0.05 to 15 parts by weight, more preferably 3 to 5 parts by weight per 100 parts by weight of the adsorbent.

Any suitable curing and hardening agent for polyepoxides or combination of curing and hardening agents can be encapsulated in a suitable adsorbent and used in the practice of my invention. I have found that the amine curing and hardening agents, and the catalytic curing agents can be encapsulated and work very well. The preferred curing agents useful in the encapsulating method of curing polyepoxides of my invention are the polybasic carboxylic acids having from 1 to 26 carbon atoms in the molecule, a polyethylene imine condensation polymer of ethylene imine, a polymerized fatty acid of a tribasic acid with a dibasic acid in the minor amount, a monomeric amine having from 2 to 26 carbon atoms in the molecule, a polymeric amine formed from a polymerizable amine froving from 2 to 26 carbons in the molecule, and mixtures thereof. Most preferable as curing agents for adsorbing and shielding in an adsorbent in the manner of my invention are ethylene diamine, triethylene tetramine, diethylene triamine, triethylamine, trimethylamine, N-methyl morpholine, dimethylethanolamine, benzyldimethylamine and triethanolamine. It has been found preferable to employ adsorbed curing or hardening agent in an amount in the range of 10 to 100 parts by weight, more preferably 30 to 50 parts by weight per 100 parts by weight of adsorbent.

In the practice of my invention of curing and hardening polyepoxide resins, any suitable polyepoxide composition of matter of a polymeric polyepoxide having an epoxide equivalency greater than one can be used. A preferred polyepoxide resin for use in the practice of my invention is a commercially available polyepoxide composition identified by the trademark of Araldite 6005. It is a low viscosity unmodified liquid epoxy resin. Araldite 6005 has a viscosity at 25 degrees C. of 7,000 to 10,000 cps., an epoxy value of 0.53 to 0.55 equivalents per 100 grams, a weight per epoxide of 182 to 191, a flash point of 480 degrees F. minimum, and a weight per gallon of 9.6 to 9.8 pounds. Another preferred composition of matter of a polymeric polyepoxide for use in the practice of my invention is a resin composition designated as DER 332. DER 332 is a resin, produced by Dow Chemical Company, Midland, Mich., of a monomeric diglydicyl ether of bisphenol A having the formula

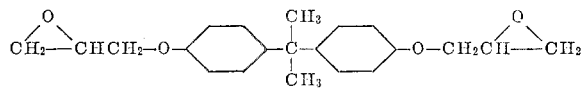

a viscosity of 3600 to 6400 centipoises, and an epoxide equivalent weight of 173 to 179. Another preferred composition of matter of a polymeric polyepoxide for use in the practice of my invention is designated as DEN 438, produced by Dow Chemical Company. It is of the epoxy-novolak class and has an epoxide equivalent of from 175–182 and a viscosity at 125 degrees F. of 30,000 to 90,000 poises.

In practicing the new method of my invention to produce polyepoxide resins, it has been found preferable to admix at room temperature and atmospheric pressure, the curable polyepoxide polymer and the shielded adsorbent containing the curing and hardening agent adsorbate. The resulting mixture is then made active preferably by heating the same to desorb the curing and hardening agent, heating to a temperature in the range of 75 degrees C. to 200 degrees C., more preferably in the range of 140 degrees C. to 150 degrees C., for a time in the range of about 3 minutes to 1 hour, more preferably for a time in the range of 8 to 20 minutes. In preparing the adsorbent it has been found preferable to add curing agent to the adsorbent in an amount in the range of from 5 to 95 parts by weight, more preferably 25 to 65 parts by weight per 100 parts by weight of the adsorbent. The curing and hardening agent is preferably added by immersing the adsorbent in the curing and hardening agent and stirring or agitating same, and this can be done easily at room or moderate temperature, for a time in the range of 2 to 48 hours, more preferably 8 to 20 hours. The adsorbent having the adsorbate curing and hardening agent is then contacted by the shielding and encapsulating agent by adding same to the curing and hardening agent with stirring or agitation. Room or moderate temperature is preferred to prevent desorption, and a period of time for adsorbing the shielding agent of from 2 to 48 hours, more preferably 8 to 20 hours, has been used.

The method of curing polyurethane resins of my invention consists of admixing a polymerizable polyether or polyester resin with a suitable amount of isocyanate and an encapsulated catalyst composition, desorbing the catalyst, and subsequently reacting the polyether or polyester and isocyanate to form a cured polyurethane resin.

In the new method of my invention of curing polyurethane resins, any suitable polymerizable polyether or polyester resin can be used. We prefer to use polyethers having a relatively high molecular weight with a relatively large number of ether linkages in the chain, with a relatively large number of side groups, having reactive hydrogen such as hydroxyl groups, amides, primary and secondary amines, preferably hydroxyl groups. Such polyethers can be formed (a) by direct polymerization of oxides of normally gaseous aliphatic hydrocarbons, more preferably ethylene oxide and propylene oxide, (b) by condensation of oxides of normally gaseous aliphatic hydrocarbons with an aliphatic polyalcohol preferably having from 3 to 8 carbon atoms in the molecule and 2 to 5 hydroxyl groups, for example glycerin, sorbitol, manitol, trimethylanol propane, and the like, (c) by sequential addition of propylene and ethylene oxides to ethylene diamine yielding products which vary widely in molecular weight, (d) by adding propylene oxide to the two hydroxyl groups of a propylene glycol nucleus and adding ethylene oxide to both ends of this base, (e) by condensation of said oxides with other starting compounds having active hydrogen such as phenol, resorcinol, and the like. Generally, I prefer to use a polyether having a molecular weight in the range of 300 to 1500, more preferably from 390 to 700. I prefer to use a polyether having a hydroxyl number above 200 and most preferably in the range of 229 to 735. The polyether has to be capable of polymerizing with an isocyanate utilizable in the practice of my invention An isocyanate monomer is employed in this embodiment of my invention, such copolymerizing with the polyether to form polyurethane. Any suitable isocyanate can be used, and the specific isocyanates set forth hereinafter are preferred ones for the purpose of illustration and not limitation. The isocyanates which are preferably used have at least two —NCO groups and are copolymerizable with the polyether, and reactable with water as a foaming agent to form carbon dioxide gas which causes the foaming of the polyurethane, if a foam product is desired. I prefer to apply 2,4-toluene diisocyanate, 2,6-toluene diisocyanate, mixtures of these toluene diisocyanates wherein 2,4 toluene diisocyanates is in major amount, for example 65–35, 70–30, and 80–20, respectively, polymethylene polyphenyl isocyanate, 3,3'-dimethyl 4,4'-biphenylene diisocyanate, 3,3'-dimethyloxyl-4,4'-biphenylene diisocyanate, diphenylmethane,4,4'-diisocyanate, methylphenylene diisocyanate, 1,5 naphthalene diisocyanate, 1,6-hexamethylene diisocyanate, triphenylmethane triisocyanate, 1-chlorophenyl 2,4 diisocyanate diphenyl-4,6,4'-triisocyanate, 1,4 cyclohexylene diisocyanate, and mixtures thereof. The isocyanate is preferably used in an amount in the range of 75 to 250 parts by weight, more preferably 165 to 175 parts by weight per 100 parts by weight of the polyester or polyether.

If the method of curing polyurethanes of my invention is used to produce a polyurethane foam a foaming agent is included in the curable mixture. Water is an important blowing agent and useful as a foaming agent. Volatile blowing agents can be used in addition, particularly if it is desired to produce relatively low density foam in the neighborhood of 1.25 to 3.5 pounds per cubic foot. Volatile blowing agents such as monofluorotrichloromethane and the like are preferred and they also have the advantage as acting as heat sinks during the reaction to produce the foam polymer.

Any suitable catalyst for polyurethane can be used in the practice of my invention. In the practice of my invention in the method of producing polyurethanes the catalyst is encapsulated in an adsorbent and a shielding secondary adsorbate as described hereinbefore, particularly in regard to producing polyepoxide resins and the adsorbed curing agent therefor. By encapsulating the catalyst in the manner of my invention it is rendered inert, easy to handle and store, and makes the reacting of the polyether and isocyanate easy to control. The preferred catalyst for curing polyurethanes to be used in the practice of my invention are triethylene amine, N-methyl morpholine, and dimethylethanol amine, and the like. The considerations governing the selection of the adsorbent and secondary adsorbate of the component combination composition of encapsulated catalysts are the same as listed hereinbefore in relation to other uses of the component combination compositions of my invention. The catalyst is preferably adsorbed by mixing same with the adsorbent and adsorbate taken up in an amount of 5 to 40 parts by weight, more preferably 10 to 25 parts by weight per 100 parts by weight of the adsorbent. Shielding is preferably accomplished in the same manner as discussed hereinbefore and with the same amount of shielding agent adsorbed. It has been found desirable to use an amount of encapsulated shielded adsorbent containing the adsorbed catalyst of from 1.5 to 25 parts by weight, more preferably 4 to 12 parts by weight per 100 parts by weight of the polyester or polyether. The encapsulated catalyst in the adsorbent is preferably added to the mixture of isocyanate and polyester or polyether at room or moderate temperatures wherein it is in an active state. The resulting mixture is made active by heating same to a temperature in the range of 125 to 350 degrees F., more preferably 225 to 275 degrees F. for a time of from 3 minutes to 4 hours, most preferably 20 minutes to 1.5 hours.

Any suitable adsorbent material having internal pore structure and active sites can be used in the practice of my invention. A preferred adsorbent for use in my invention is silica gel. Silica gel, as is well known in the art, can be prepared by heating finely powdered silica in a bomb with water to a temperature of 400 to 500 degrees F. to obtain an intermediate product called ortho-silicac acid. Ortho-silicac acid is then dehydrated by controlled heating, whereupon it reverts to a porous structure known as silica gel. Preferred commercially produced silica gel suitable for use in the practice of my invention are, (1) Davidson No. 12 having a specific surface area of 830, a specific pore volume of 0.45, and an average pore diameter of 22 angstrom units, (2) Davidson MS having a specific surface area of 700, a specific pore volume of 0.71, and an average pore diameter of 41 angstrom units, and (3) Davidson No. 62 having a specific surface area of 840, a specific pore volume of 1.16 and an average pore volume of 140 angstrom units. Another preferred type of adsorbent material for use in the practice of my invention is the class of materials known as the synthetic metal-alumina silicates. These materials have a three-dimensional crystal structure. When synthesized, the crystals contain water of hydration which can be driven out by heating to a sufficiently high temperature without collapsing the crystal lattice. They are chemically inert in the presence of most compounds except strong acids. Each particle of the synthetic metal-alumina silicate adsorbent is a single crystal which contains literally billions of tiny cavities or cages interconnected by channels of unvarying diameter. The size and position of the metal ions in the crystals control the effective diameter of the interconnected channels. A commercially available synthetic metal-alumina silicate suitable for use in the practice of my invention is Linde 13X. It is a sodium alumina silicate having a specific surface area of 700 to 800, a specific pore volume of 0.28, and an average pore diameter of 13 angstrom units. Other suitable adsorbents are Linde 4A and 5A, also sodium alumina silicates, having smaller channel diameters which permit adsorption of molecules smaller than about 4 and 5 angstrom units, respectively. The combined effect of the uniformly small channel size and strong surface forces which distinguish metal-alumina silicates from other adsorbents essentially isolates the compounds caged within the crystal lattice. A compound caged within the lattice and shielded with a secondary adsorbate in the manner of my invention will remain confined until released by heat or by displacement with an adsorbable material. Certain types of carbon black are also suitable as adsorbent materials in the practice of my invention. These carbon blacks are mixtures of polynuclear aromatic substances, and are the product obtained from heating of various hydrocarbon products in an absence or a limited amount of oxygen. A commercially available adsorbent suitable for use in the practice of my invention is designated by the trademark of Shawinigan Acetylene Black, which is produced by a continuous thermal decomposition of acetylene gas at a temperature of about 1500 degrees C. This adsorbent material has an apparent density of 6.25, a true density of 1.95, a particle size having a means value of 420 plus or minus 25 angstrom units, and a surface area of 70 square meters per gram. It is made up of 99.5 percent carbon, 0.04 percent moisture, 0.06 percent volatile matter, 0.03 percent ether extract, and 0.04 percent ash. Another suitable adsorbent material for use in the practice of my invention is charcoal. Charcoal is produced by heating wood or bone in the absence of oxygen to a high temperature. Another suitable adsorbent for use in the practice of my invention is designated by the trademark of Kosmos B—B, and is a carbon black having good internal pore structure.

Any suitable shielding secondary adsorbate can be used in the practice of my invention. It has been found that the secondary adsorbate desirably meets the following requirements: (1) inertness to both the primary adsorbate and the surrounding medium, and (2) more strongly adsorbed than the molecules of the surrounding medium. Further, its molecular size should preferably be greater than the diameter of the adsorbent pore. The secondary adsorbate is attached to the adsorbent to effectively seal the primary absorbate in the pores of the adsorbent. The shielding secondary adsorbate is held in place on the adsorbent by physical attraction due to the Van der Walls' forces. This relative positioning and placement on the secondary adsorbate hinders and impedes any reaction between the primary adsorbate and the active ingredients in the surrounding medium. Preferred secondary adsorbates for use in the practice of my invention are vinyl-cyclohexane dioxide, 2,5 hexane dione, allylazealate squalene, and the like compounds.

Any suitable primary adsorbate can be used in the practice of my invention in the method of encapsulating chemicals, the resulting encapsulated component product, and methods of reacting materials. I have found that the following types of chemicals can be used as primary adsorbates and loaded into an adsorbent and shielded with a secondary adsorbate in the manner of my invention. The chemicals are: amines, ethers, alcohols, aldehydes, ketones, esters, peroxides, hydrocarbons, anhydrides, organic acids, organometallic compounds, halogens, acid gases, perfumes, etc. Most preferably, the following compounds have been found very useful as primary adsorbates in the practice of my invention: piperidine, di-n-butylamine, di-tert-butyl peroxide, catechol, diethyl thiourea, hydrogen chloride, triethanolamine, ammonia, triethylamine, ethylene diamine, triethylene tetramine, pyrrolodine, morpholine, N-methyl morpholine, dimethylethanolamine, diethylene triamine, benzyldimethylamine, etc.

Any suitable solvent can be used in my process of producing the encapsulated component combination composition of my invention by the solution method. Most solvent molecules are small enough to be adsorbed within the pore structure of the adsorbent being used. Therefore, solvent molecules are potential displacing agents. Whether or not a solvent will displace the primary or secondary adsorbate from the adsorbent is a function of the relative adsorptivity of the solvent and the primary and secondary adsorbates. The degree in which adsorbable solvents are adsorbed is a function of the volatility and polarity of the solvents. The more polar a solvent is the more strongly it is adsorbed. The more volatile the solvent is the less strongly it is adsorbed. The preferred solvent for use in any system has been found to be one which is physically too large to be adsorbed by the adsorbent and hence cannot cause any displacement. A list of classes of solvents arranged in the order of increasing tendency to cause displacement of a primary or secondary adsorbate from an adsorbent are:

(1) Normal hydrocarbons
(2) Glycol ethers
(3) Ethers
(4) Benzene
(5) Toluene
(6) Xylene
(7) Phthalates
(8) Vinyl monomers In the following is set forth examples of my invention which are given by way of illustration and not by limitation. The specific compounds, temperatures, times proportions, etc. set forth in these examples are not to unduly limit the scope of my invention.

Example I

A curable polyepoxide mixture with the curing agent adsorbed in an adsorbent material but without a shielding secondary adsorbate was prepared. A mixture was prepared by mixing the following:

| | Parts by weight |
|---|---|
| Araldite 6005 (25 gr.) | 100 |
| Linde 13× (5 gr.) | 20 |
| Diethylene triamine (2 cc.) | 8 |

The diethylene triamine was mixed with the Linde 13× in a suitable vessel, and left to stand for 10 minutes. Araldite 6005 was then added and the resultant mixture agitated. It was stored for a later test comparison, as is explained hereinafter.

Example II

A curable polyepoxide mixture with the curing agent adsorbed in an adsorbent material and with the curing agent shielded with a secondary adsorbate was prepared by mixing the following:

| | Parts by weight |
|---|---|
| Araldite 6005 (25 gr.) | 100 |
| Linde 13× (5 gr.) | 20 |
| Diethylene triamine (2 cc.) | 8 |
| Vinylcyclohexene dioxide (1 cc.) | 4 |

The diethylene triamine was mixed with Linde 13× and the mixture left standing for 10 minutes. Vinylcyclohexene dioxide was then added and mixed in the mixture. The resulting mixture was left standing for an additional 10 minutes. Araldite 6005 was then added and the resultant curable mixture agitated. The mixture produced was quite inactive at room temperature and proved to have a long shelf life. The mixture was stored for a later test comparison, as is explained hereinafter.

Example III

A curable polyepoxide resin mixture comparable to the mixture prepared in Example II but utilizing a different shielding secondary adsorbate was prepared by mixing the following:

| | Parts by weight |
|---|---|
| Araldite 6005 (25 gr.) | 100 |
| Linde 13× (5 gr.) | 20 |
| Diethylene triamine (2 cc.) | 8 |
| 2,5-hexane dione (1 cc.) | 4 |

The above-listed ingredients were combined in generally the same manner described in Example II. The resulting mixture was quite chemically inactive at room temperature and proved to have a long shelf life. The mixture was stored for a later test comparison, as is explained hereinafter.

Example IV

A curable polyepoxide resin comparable to the mixture produced in Examples II and III but utilizing a different shielding secondary adsorbate was prepared from the following:

| | Parts by weight |
|---|---|
| Araldite 6005 (25 gr.) | 100 |
| Linde 13× (5 gr.) | 20 |
| Diethylene triamine (2 cc.) | 8 |
| Allylazelate (1 cc.) | 4 |

The above-listed ingredients were combined in the same manner and order described in Example II. The resulting mixture was quite inert at room temperature and proved to have a long shelf life. The mixture was stored for a later test comparison, as is explained hereinafter.

Example V

A comparison between the curable epoxide resin mixture samples prepared in Examples I, II, III, and IV was made to determine the effectiveness of the shielding secondary adsorbate as an encapsulating agent for the primary adsorbate. The amine cured epoxy resin system was chosen for the demonstration of the effectiveness of the encapsulating technique. The choice was made because (1) the reactions are exothermic and can be followed readily, (2) the reactions are rapid and can be completed in a short time, and (3) there is a definite need to impede this type of reaction. In the test the various curable mixtures were heated to make the amine curing agent (primary adsorbate) available to the epoxide resin thus setting the stage for the curing reaction. Since the reaction was exothermic a sudden rise in the temperature of the mixture resulted, not caused by any external heating of the mixture, and such indicated the reaction was occurring. Generally, the higher the temperature that the mixture must be heated in order to release the encapsulated amine curing agent, the more effective is the encapsulation system. Each of the aforementioned prepared mixtures was placed in an oven. Another blank consisting of an equal weight of only Araldite 6005 was also placed in the oven with the curable epoxide sample tested to serve as a standard. A first recorder connected to a thermocouple was used to measure the temperature of the standard blank of Araldite. The thermocouple of the first recorder was inserted within the standard blank. A second recorder was used to measure in turn the differential temperature between each of the samples prepared in Examples I, II, III and IV and the aforementioned standard blank as each test run was made with each mixture. The differential temperature was measured by inserting a first thermocouple in the curable mixture being tested, inserting a second thermocouple connected in series with the first thermocouple into the standard blank of Araldite 6005, and connecting the thermocouples to said second recorder so that it measured the differential temperature between the two aforementioned mixture and blank. The blank and mixture were placed in the oven while at room temperature, and the oven turned on and allowed to heat up. With the results from the first and second recorders two graphs were prepared. In all the test runs the mixtures were kept in the oven for about 30 minutes in order to gather the necessary data. Since the purpose of the test was to determine when the curing reaction was initiated, the oven was shut off as soon as the differential temperature between the blank sample and the curable mixture showed a definite trend to decrease. The polyepoxide was not completely cured at the time the mixture was removed from the oven. The first graph contained a plot of oven temperature as measured by the temperature in blank vs. time. The second graph contained a plot of differential temperature between the standard blank and mixture vs. time. The plotted results of the two aforementioned graphs were combined to eliminate one parameter, namely time. The replotted data consisted of a plot of differential temperature vs. oven temperatures. The same procedure was followed in turn with each of the samples prepared in Examples I, II, III and IV and a standard sample. All of the final test results of the samples, namely a plot of differential temperature vs. oven temperature, were plotted on a single graph for ease of comparison.

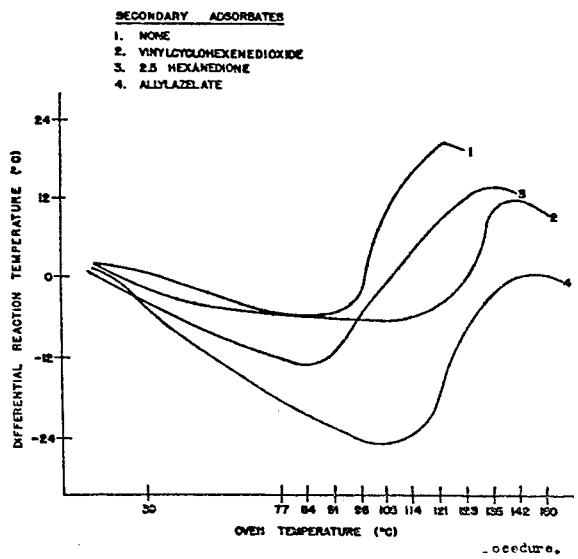

The above graph was the result of the aforementioned procedure. Examining line 1 which was a result of a plot of the sample prepared in Example I containing no shielding secondary adsorbate on the adsorbent, it was noted that the differential temperature was relatively constant as the oven temperature increased, even dropping slightly. The drop in differential temperature was caused by the adsorption of a portion of the oven heat to release the curing agent from the adsorbent. The sudden subsequent rise in the curve, indicating a sudden rise in differential temperature, indicates that a reaction occurred in the curable epoxide resin mixture, causing a temperature rise in the curable sample, the heat resulting from the exothermic polyepoxide amine reaction. Comparing lines 2, 3 and 4, plotted from the results of mixtures produced in Examples II, III and IV each containing a secondary adsorbate in combination with adsorbent, with the line 1 for the sample containing a curing agent adsorbed in an adsorbent without a shielding agent, it is evident that the sharp rise in the differential temperature was delayed in each instance until a higher oven temperature was reached. This indicates that the encapsulated curing agent sealed in the absorbents with secondary adsorbers are more stable than the encapsulated curing agent without the secondary adsorbate. In short, the curing reaction, between the amine curing agent and the epoxide resin did not occur in Examples II, III and IV until the oven temperature was raised to a point above that of the point where the reaction progressed in Example I. The sharper slope of lines 2, 3 and 4 in the initial portion of the curve was caused because a greater amount of heat energy was needed to release the encapsulated curing agent from the adsorbent in combination with a secondary adsorbate than a curing agent adsorbed in an adsorbent without a shielding secondary adsorbate. Note line 1 on the graph indicates that the reaction of the mixture prepared in Example I without a shielding agent occurred when the oven temperature was in the temperature range of from 90 degrees C. to 121 degrees C. The mixture of Example II (line 2) was reacted when the oven temperature was in the range of 114 degrees C. to 142 degrees C. This clearly shows the stabilizing effect of the shielding adsorbate of my invention. Note that the mixture of Example III (line 3) was reacted when the oven temperature was in the range of 85 degrees C. to 135 degrees C. and the line has a smaller slope than line 1. This shows the delaying or modifying effect of the shielding agent of my invention used in combination with an adsorbent. The graph thus very clearly illustrates the increase, the greater inertness and stability of an encapsulation system comprised of an adsorbent in combination with a second adsorbate for making an encapsulated agent less reactive in a reactive surrounding medium, is greater than a comparable encapsulation system comprised of only an adsorbent.

Example VI

The effectiveness of a secondary adsorbate on various types of adsorbents was demonstrated by the production and testing of a series of encapsulated systems. The following curable resin mixture was prepared:

|  | Parts by weight |
|---|---|
| DER 332 (20 gr.) | 100 |
| Metaphenylene diamine (5 gr.) | 25 |
| Davidson 12 (5.5 gr.) | 27.5 |

Metaphenylene diamine was melted and Davidson 12 (silica gel) added to the melt. The mixture was then heated at 220 degrees F. for a few minutes with occasional stirring. Upon cooling to room temperature, the mixture remained as a powder with a particle size not too different from the original silica gel. DER 332 was then added and the mixture stirred. The product was a curable resin sample having therein a curing agent adsorbed in an adsorbent, but which included no shielding agent.

Example VII

The following curable expoxide resin mixture was prepared:

|  | Parts by weight |
|---|---|
| DER 332 (25 gr.) | 100 |
| Metaphenylene diamine (5 gr.) | 25 |
| Davidson 12 (silica gel) (5.5 gr.) | 27.5 |
| Squalene (1.5 cc.) | 7.5 |

Metaphenylene diamine was melted and the Davidson 12 silica gel added to the melt. The resulting mixture was heated to 220 degrees F. for a few minutes with occasional stirring. After cooling the mixture to room temperature squalene was added and the resulting mixture stirred vigorously. Subsequently the mixture, constituting an adsorbent having curing agent adsorbed therein, and a shielding adsorbate adsorbed thereon was added to the DER 332.

Example VIII

A comparison test was made betwen the samples prepared in Examples VI and VII to determine the effectiveness of the secondary adsorbate namely squalene of an encapsulating agent in combination with a silica gel adsorbent. Basically, the same procedure was used as was outlined in Example V. The resulting plot of differential reaction temperature vs. oven temperature revealed that the reaction of the curing agent and the epoxide resin in the mixture prepared in Example VII containing the squalene as a secondary adsorbate required a higher oven temperature to initiate the reaction than did the mixture prepared in Example VI without the secondary adsorbate. The mixture of Example VI showed a sharp exothermic effect, indicating a reaction, when the oven temperature was in the range of 107 degrees C. to 167 degrees C., while the mixture of Example VII showed the same effect when the oven temperature was in the range of 130 degrees C. to 180 degrees C. This indicates that the squalene as a shielding adsorbate on a silica gel adsorbent has a stabilizing effect on the encapsulated composition in contact with a reactive surounding medium.

Example IX

The following mixture was prepared:

| | Parts by weight |
|---|---|
| Araldite 6005 (25 gr.) | 100 |
| Norit charcoal (5 gr.) | 20 |
| Diethylene triamine (2 cc.) | 8 |

The above ingredients were combined in the usual manner, first thoroughly degassing the Norit charcoal and subsequently adding diethylene triamine to form an encapsulated curing agent, but without a shielding adsorbate. The adsorbent charcoal and adsorbed curing agent was then added to Araldite 6005 forming a curable polyepoxide mixture which was stored.

Example X

The following mixture was prepared:

| | Parts by weight |
|---|---|
| Araldite 6005 (25 gr.) | 100 |
| Norit charcoal (5 gr.) | 20 |
| Diethylene triamine (2 cc.) | 8 |
| 2,5-hexene dione (1 cc.) | 4 |

The above ingredients were combined in the usual aforedescribed manner. The end result was a curable polyepoxide mixture having a curing agent adsorbed in a charcoal adsorbent with a shielding adsorbate.

Example XI

The curable polyepoxide mixtures prepared in Examples IX and X were compared with each other using the procedure outlined in Example V. An examination of a plot of differential temperature vs. oven temperature revealed that the reaction of the mixture prepared in Example X containing an adsorbed curing agent with a shielding secondary adsorbate, namely, 2,5, hexene dione, required a higher oven temperature to initiate the reaction than did the mixture prepared in Example IX containing an adsorbed curing agent with no secondary adsorbate. The reaction was initiated in the mixture of Example IX when the oven temperature reached 70 degrees C. The reaction was initiated in the mixture of Example X when the oven temperature was 100 degrees C. Thus, the addition of the shielding secondary adsorbate to an adsorbed chemically reactive compound in an adsorbent had a stabilizing effect on the encapsulated compound in contact with a chemically reactive surrounding medium.

Example XII

The following reactable mixture was prepared:

| | Parts by weight |
|---|---|
| DEN 438 (25 gr.) | 100 |
| Triethylene tetramine (4 cc.) | 15 |
| Linde 13X (10 gr.) | 40 |

The above ingredients were combined in the manner set forth in Example I. The curable polyepoxide mixture was stored for susequent test comparisons.

Example XIII

The following mixture of a reactable epoxide including a shielding secondary adsorbate in combination with an adsorbent having a curing agent adsorbed therein was prepared for a comparison with a mixture prepared in Example XII.

| | Parts by weight |
|---|---|
| DEN 438 (25 gr.) | 100 |
| Triethylene tetramine (4 cc.) | 15 |
| Linde 13X (10 gr.) | 40 |
| 2,5-hexene dione (1 cc.) | 5 |

The above ingredients were combined in the manner set forth in Example II. The end product was a curable polyepoxide mixture having therein a chemically reactive curing agent adsorbed in combination with adsorbent with a shielding adsorbate.

Example XIV

The mixtures prepared in Examples XII and XIII were compared according to the procedure outlined in Example V. The results were plotted differential reaction temperature vs. oven temperature. An examination of the plotted results revealed that the reaction of the mixture prepared in Example XIII containing an adsorbed curing agent with a shielding secondary adsorbate required a higher initiation temperature than the mixture prepared in Example XII without a shielding adsorbate. This indicates that the secondary adsorbate present in the mixture of Example XIII has a stabilizing effect on the encapsulated curing agent thus making the mixture more stable.

Example XV

The following is mixed:

| | Parts by weight |
|---|---|
| DER 332 | 100 |
| Ensapsulated curing agent | 5 |

The encapsulated curing agent consisted of:

| | |
|---|---|
| United Carbon Kosmos B–B | 100 |
| Boron trifluoride monoethylamine | 25 |
| 2,5-hexane dione | 16 |

In preparing the encapsulated curing agent, the United Carbon Kosmos B–B was treated for 6 hours by heating at 800 degrees C. at a pressure less than 1 micron of mercury. After heating for 6 hours, the United Carbon Kosmos B–B is cooled in vacuo to room temperature. Boron trifluoride monoethylamine was added to the United Carbon Kosmos B–B with stirring while heating to 100 degrees C. The boron trifluoride monoethylamine was adsorbed in the carbon at this stage. The resulting product was cooled to room temperature and 2,5- hexane dione added while stirring.

The encapsulated curing agent was mixed with DER 332 in the ratio indicated hereinbefore while the components were at room temperature. The resultant mixture was quite inert at room temperature. The resultant curable resin mixture was heated to 170 degrees for a period of 3 hours whereupon it underwent a complete cure. The resultant cured polyepoxide resin appeared to be fully cured and was of good quality.

EXAMPLE XVI

The following example illustrates my desiccator method of loading an adsorbate into an adsorbent, and subsequently adsorbing the shielding secondary adsorbate on the adsorbent. The following components were used:

| | Parts by weight |
|---|---|
| Linde 13X | 100 |
| Diethylene tetramine | 40 |
| 2,5-hexane dione | 20 |

The absorbent namely Linde 13X was initially degassed by heating at 350 degrees C. for 12 hours under air atmosphere. The degassed adsorbent was then placed while hot in a desiccator which was then evacuated. The adsorbent was then allowed to cool under vacuum. Diethylene tetramine was introduced into the desiccator, which was still evacuated, and the components allowed to stand for 48 hours at room temperature. The shielding secondary adsorbate, namely 2,5 hexane dione, was then introduced into the desiccator and the desiccator evacuated. The resultant mixture was allowed to stand for 48 hours at room temperature. At the end of this time an embodiment of a shielded encapsulated composition of my invention was produced.

Example XVII

The application of shielded adsorbents of my invention for encapsulating gases is illustrated by the production of a specific embodiment of my invention from the following:

| | Parts by weight |
|---|---|
| Linde 5A | 100 |
| HCl (155 cc.) | 15 |
| Squalene | 25 |

The adsorbent, namely Linde 5A, is degassed by heating it at 350 degrees C. for 12 hours. The degassed adsorbent is then placed into a desiccator. The desiccator is evacuated and the HCl introduced therein. The adsorbent and HCl are allowed to stand for 48 hours undisturbed. Subsequently, the squalene is introduced into the desiccator and the resulting mixture allowed to stand for 48 hours. Then end product is an embodiment of my invention of an adsorbent loaded with HCl gas and shielded by adsorbed squalene. The encapsulated composition product is inert and very stable at room temperature.

Example XVIII

The applicability of the shielded adsorbent system of my invention for storing a gas is further illustrated by the following:

| | Parts by weight |
|---|---|
| Linde 5A | 100 |
| Ammonia | 10 |
| Vinyl cyclohexene dioxide | 20 |

Basically the same procedure as set forth in Example XVII is used to load the ammonia into the adsorbent and adsorb the shielding agent. The end product is a stable, non-volatile, encapsulated shielded ammonia gas product having a long shelf life and a very small vapor pressure.

Example XIX

The applicability of the shielded adsorbent system of my invention for use in the production of polyurethane resins is demonstrated by utilizing it as an encapsulating agent for a well-known catalyst for polyurethanes. The encapsulated catalyst composition is prepared from the following:

| | Parts by weight |
|---|---|
| Linde 13X | 100 |
| N-methyl morpholine | 14 |
| Squalene | 25 |

Basically, the same procedure described in Example XV is used to load the morpholine into the adsorbent and adsorb the shielding agent. The end composition is an inert material utilizable as a catalyst for use in producing polyurethane plastic material which is relatively inert and has a long shelf life at room temperature.

Example XX

The applicability of the encapsulated component combination of my invention for use in the curing of rubber is demonstrated by the following:

| | Parts by weight |
|---|---|
| Linde 13X | 100 |
| Morpholine | 14 |
| Squalene | 25 |

Basically the same procedure outlined in Example XV is used to load the morpholine in the adsorbent and adsorb the shielding agent. Morpholine is useful as a secondary accelerator in rubber. The end product is secondary accelerator for use in curing rubber adsorbed in an adsorbent material and shielded with a secondary adsorbate having a long shelf life and being relatively inert. The active accelerator so encapsulated is stable, easy to store, handle, and control. The encapsulated accelerator will increase the versatility of rubber curing processes.

Example XXI

This example demonstrates how the encapsulated component composition of my invention can be activated with a displacing agent. A curable polyepoxide resin mixture was chosen for the demonstration. However, the procedure can be used on other encapsulated chemicals used in other applications. To the curable polyepoxide resin mixture prepared in Example VI was added four grams of water at room temperature. An exothermic effect was observed. The curable resin mixture cured at room temperature, solidifying into a hard resinous mass in a period of 20 minutes.

Example XXII

This example further demonstrates the use of a displacing agent to displace the shielding adsorbate and adsorbed chemical reagent from the adsorbent. To the curable polyepoxide resin mixture prepared in Example VI is added 6.4 grams of methanol. An exothermic effect is observed. The resin mixture cured at room temperature in 20 minutes, solidifying into a hard resinous mass.

Example XXIII

A rigid polyurethane foam material from a polyester is prepared using the encapsulated catalyst for polyurethanes produced in Example XIX. The following ingredients were admixed:

| | Parts by weight |
|---|---|
| Polyester PFR-6 | 100 |
| Water | 4 |
| Encapsulated catalyst product from Example XIX | 8 |
| Nacconate 1080-8 | 170 |

Nacconate 1080-8 is a modified toluene diisocyanate especially designed for the manufacture of rigid foams. It has an isocyanate equivalent of 118 to 123, and a viscosity at 77 degrees F. of 150 to 200 centipoises. Polyester PFR-6 is a trademark designating a reactive polyglycol product having an acid number of 15 to 20, a hydroxyl number of 465 to 495, and a water content of 0.1 to 0.4 percent. The resulting mixture is relatively inactive at room temperature. It is adapted for applications where the resin is foamed in place. The resin mixture is cured by heating it to 250 degrees F. for an hour for each inch of cross section. A rigid foam was produced having a density of 2.0 to 2.5 pounds per cubic foot and was of uniform cell structure.

As will be evident to those skilled in the art, various modifications of this invention can be made, or followed, in the light of this disclosure and discussion, without departing from the spirit or the scope of the disclosure or from the scope of the claims.

I claim:

1. A method of reacting and curing a curable polyepoxide with diethylenetriamine comprising, (A) admixing at room temperature (1) a curable polyepoxide polymer produced by reacting a polyhydric phenol with epichlorohydrin, and having an epoxide equivalent weight in the range of 173–194 and a viscosity at 25 degrees C. in the range of 500 to 16,000 cps., and (2) an encapsulated curing agent comprised of (a) a sodium alumina silicate adsorbent having internal pore structure and active pore sites, a specific surface area in the range of 700 to 800, a specific pore volume of approximately .28, and an average pore diameter of approximately 13 angstrom units, (b) diethylenetriamine adsorbed in the active pore sites of said adsorbent in an amount in the range of 38 to 42 parts by weight, and (c) vinylcyclohexene dioxide adsorbed on the exterior surface of said adsorbent in a position shielding said diethylenetriamine in an amount in the range of 3 to 5 parts by weight, each per 100 parts by weight of said adsorbent of sodium alumina silicate, said encapsulated curing agent present in the resulting mixture in an amount in the range of 30 to 35 parts by weight per 100 parts by weight of said curable polyepoxide, (B) heating the resulting mixture to a temperature in the range of 140 degrees C. to 150 degrees C. and desorbing vinylcyclohexene dioxide from its shielding position, and diethylenetriamine from the active pore sites in the molecular sieve, and (C) curing the polyepoxide mixture by continued heating.

2. A method of curing a polymeric polyepoxide comprising, (A) admixing (1) a resin comprised of a composition of matter of a polymeric polyepoxide having an

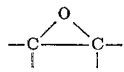

equivalency greater than 1, and (2) an encapsulated curing agent comprised of (a) an adsorbent having internal pore structure and active pore sites selected from the group consisting of sodium alumina silicate, silica gel, activated carbon black, activated charcoal, and mixtures thereof, (b) a curing and hardening agent for polyepoxides selected from the group consisting of a polybasic carboxylic acid having from 1 to 26 carbon atoms in the molecule, a polyethylene imine condensation polymer of ethylene imine, a polymerized fatty acid of a tribasic acid with a dibasic acid in the minor amount, a monomeric amine having from 2 to 26 carbon atoms in the molecule, a polymeric amine formed from a polymerizable amine having from 2 to 26 carbon atoms in the molecule, and mixtures thereof, adsorbed in the active pore sites of said adsorbent in an amount sufficient to harden and cure said polyepoxide, and (c) a shielding agent adsorbed on the surface exterior of said adsorbent in a position shielding said curing and hardening agent and selected from the group consisting of vinylcyclohexene dioxide, 2, 5, hexanedione, allylazelate, squalene, and mixtures thereof in an amount sufficient to shield said adsorbed curing and hardening agent within the active pore sites of said adsorbent, (B) heating the resulting mixture to desorb the shielding agent from its shielding position on the adsorbent and the curing and hardening agent from the active pore sites of said adsorbent (C) curing the resulting activated mixture.

References Cited

UNITED STATES PATENTS

| | | | |
|---|---|---|---|
| 3,036,980 | 5/1962 | Dunham | 260—31.4 |
| 3,226,214 | 12/1965 | Daniels | 51—298 |
| 3,235,620 | 2/1966 | Phillips | 260—830 |

MURRAY TILLMAN, *Primary Examiner.*

LEON J. BERCOVITZ, *Examiner.*

PAUL LIEBERMAN, *Assistant Examiner.*